UNITED STATES PATENT OFFICE.

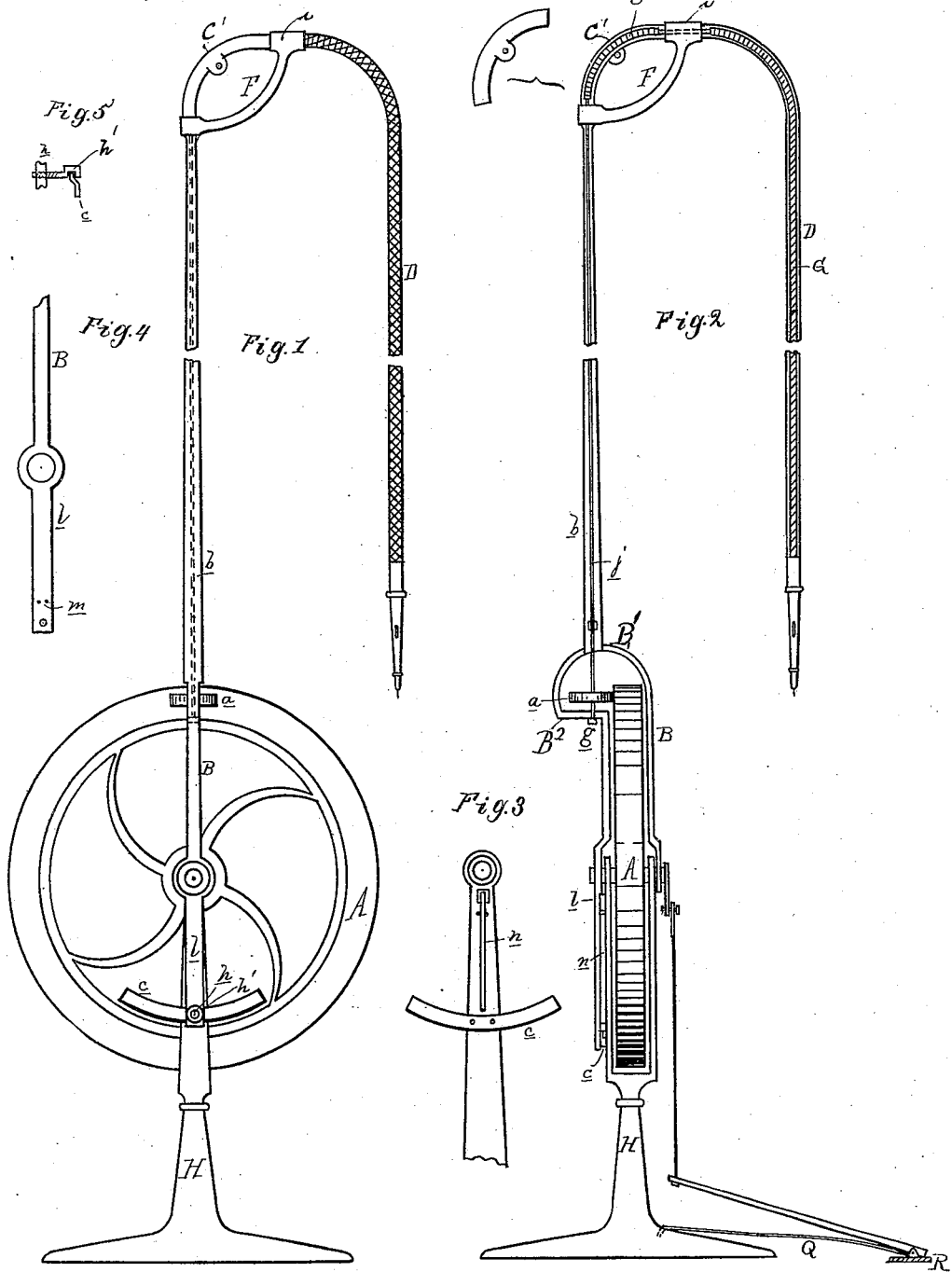

ALONZO W. ELDREDGE, OF BIG RAPIDS, MICHIGAN.

DENTAL ENGINE.

SPECIFICATION forming part of Letters Patent No. 313,411, dated March 3, 1885.

Application filed October 10, 1884. (No model.)

*To all whom it may concern:*

Be it known that I, ALONZO W. ELDREDGE, of Big Rapids, in the county of Mecosta and State of Michigan, have invented new and useful Improvements in Dental Engines; and I do hereby declare that the following is a full, clear, and exact description thereof, reference being had to the accompanying drawings, which form a part of this specification.

This invention relates to an improvement in dental engines; and it consists of an improved mechanical construction of different parts thereof, all as more fully hereinafter described, and set forth in the claims.

In the drawings which accompany this specification, Figure 1 is an elevation of my improved dental engine. Fig. 2 is a side view thereof. Figs. 3, 4, and 5 are details specifically referred to in the drawings.

A is a drive-wheel journaled in proper bearings of the standard H, and $a$ is a friction-wheel bearing against the rim of the drive-wheel, and preferably provided with a rubber tire to prevent slipping and make it run noiselessly. This friction-wheel is secured upon the small shaft $j$, which, at its lower end, is supported upon a bearing-point, $g$.

$b$ is a hollow tube, in which the small shaft $j$ is inclosed and held in suitable bearings.

C is a flexible shaft connected at one end with the top of the shaft $j$, as shown in Fig. 2, and at the other end with the spindle $i$, which is journaled through the outer end of the bracket F. This latter is sleeved upon the top of the tube $b$ and freely turns thereon.

G is the flexible arm of the engine-shaft. It is connected to the spindle $i$, and is inclosed in a sheath, D, which is made of fine spring-wire tempered and braided to form a tube either round or prismatic, making a flexible tube that requires no other covering, and will not stretch and break the coil G. The tube $b$ is secured to the top of the yoke B, and the latter is adapted to be oscillated with the bearing of the balance-wheel as its pivot. The arm $l$ of the yoke B passes below the center of the drive-wheel, and a lock-bolt, $h'$, passes through its free end, by means of which it can be locked to the segmental plate $c$.

Underneath the arm $l$ of the yoke, and secured to the standard, is a spring, $n$, Fig. 3, the tension of which holds the tube $b$ in a perpendicular position when the nut $h$ is loose; or if the standard is thrown over either way at any angle to its perpendicular position it can be clamped in this position by tightening the nut $h$ on the clamp-bolt $h'$.

Fig. 4 shows the inner side of the yoke B. The two pins $m$ stand each side of the spring $n$.

The pitman of the drive-wheel is connected with the treadle, the end of which is hinged to a shoe, R, and to the treadle is secured a spring, Q, bent so that it will hold the crank off the center. The short coil C is also inclosed in a tube, C', which is preferably made in halves, with one half forming a removable cap.

What I claim as my invention is—

1. In a dental engine, the combination of the stand H, the turning-wheel A, and the yoke B, pivoted on the axle of wheel A, and having a bow, B, and offset $B^2$, with the tube $b$ and shaft F, said shaft having bearings in the tube $b$ and in the offset $B^2$, and provided with a horizontal friction-wheel, $a$, bearing on the side of the wheel A, substantially as described and shown.

2. In a dental engine, the oscillating standard $b$ with its yoke B, pivotally secured upon the shaft of the drive-wheel, in combination with the arm $l$ of the yoke extending beyond its pivotal point, lock-bolt $h'$, nut $h$, and the segmental plate $c$, all arranged substantially as described.

3. In a dental engine in which the standard carrying the shafting is provided with a yoke pivotally supported on the shaft of the drive-wheel, the combination of pins, as $m$, attached to an extension of the yoke, with a spring, $n$, fixidly attached to the drive-wheel support, as and for the purposes set forth.

4. In a dental engine, the combination of the continuous line of shafting $j$ C G, which conveys the motion from the drive-wheel to the hand-piece with the straight tube $b$, having bearings for the shaft $j$, and the elbow-tube C', serving to sheath, deflect, and support the shaft C, and the flexible sheath D, which envelops and protects the flexible shaft G, substantially as and for the purpose described.

5. In a dental engine, the combination of the friction-pulley $a$ and oscillating standard pivoted on the shaft of the drive-wheel, with a continuous line of shafting between said friction-pulley and the hand-piece, consisting of the rigid shaft *j*, flexible shaft C, spindle *i*, and flexible arm G, substantially as described.

6. In a dental engine, the combination of its continuous line of shafting *j* C G and its supporting-standard *b*, with the swivel-bracket F, having a curved tubular portion, C', supporting and guiding the intermediate shaft-section C, substantially as described.

7. In a dental engine, the tube C' of the swiveled bracket F of the standard made in halves, one half serving as a removable cap, in combination with the flexible intermediate shafting, C, inclosed in said tube and having bearings near the ends of said tube, substantially as described.

ALONZO W. ELDREDGE.

Witnesses:
J. D. CUTTER,
CHAS. D. BRONSON.